O. C. TUTTLE.
FISH BAIT.
APPLICATION FILED MAY 12, 1921.
1,395,533.
Patented Nov. 1, 1921.
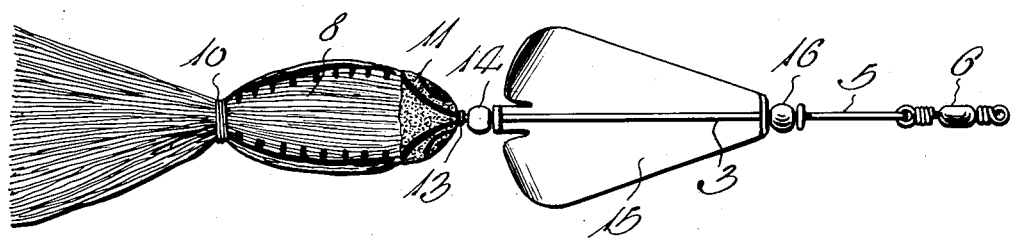
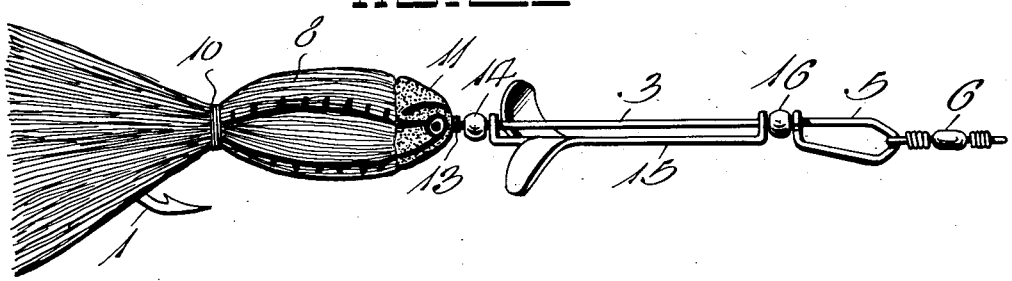
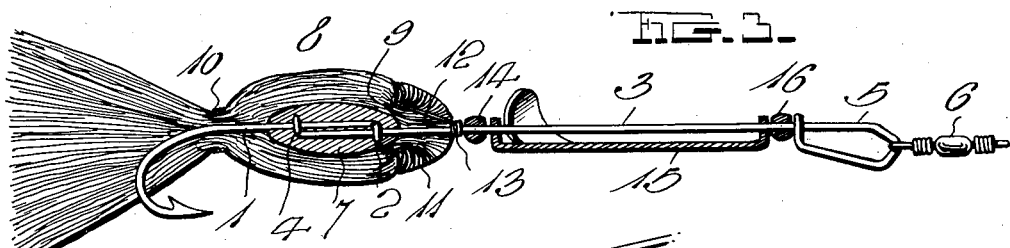
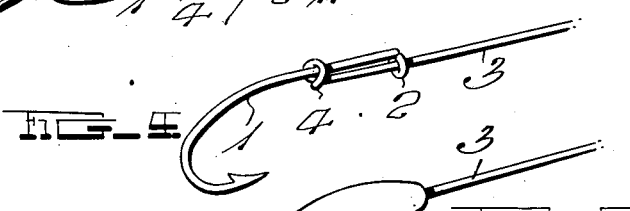
Witness
H. Woodard
Inventor
O. C. Tuttle
By H. B. Wilson &co
Attorneys

UNITED STATES PATENT OFFICE.

ORLEY C. TUTTLE, OF OLD FORGE, NEW YORK.

FISH-BAIT.

1,395,533.  Specification of Letters Patent.  Patented Nov. 1, 1921.

Application filed May 12, 1921. Serial No. 468,827.

*To all whom it may concern:*

Be it known that I, ORLEY C. TUTTLE, a citizen of the United States, residing at Old Forge, in the county of Herkimer and State of New York, have invented certain new and useful Improvements in Fish-Bait; and I do declare the following to be a full, clear, and exact description of the invention, such as will enable others skilled in the art to which it appertains to make and use the same.

My invention has for its principal object to improve upon the construction shown by my U. S. Patent 1,302,102 of April 29, 1919, by mounting a sinker on the shank of the hook and using this sinker as a core upon which to form the body of the bait.

A further object is to utilize the sinker as a rigid connecting means between the shank of the hook and the wire which leads from the hook to the usual swivel which is connected with the line.

With the foregoing in view, the invention resides in the novel device hereinafter described and claimed, the descriptive matter being supplemented by the accompanying drawings.

Figures 1 and 2 are elevations of a fish bait constructed in accordance with my invention.

Fig. 3 is a longitudinal sectional view.

Fig. 4 is a perspective view of the hook and its carrying wire.

Fig. 5 is a perspective view showing the manner in which the hook and wire are connected by the sinker.

In the drawings above briefly described, the numeral 1 designates a common form of fish hook having a laterally turned eye 2 which receives a length of relatively stiff wire 3, one end of said wire being bent around the shank of the fish hook as indicated at 4, while the other end of said wire is formed into a loop 5 connected with the usual swivel 6, this swivel being adapted for connection to the fishing line in the usual manner.

An elongated, preferably elliptical sinker 7 is molded around the parallel portions of the hook 1 and the wire 3 and around their eyes 2 and 4 so as to form a rigid connection between said hook and wire as well as performing the function of a sinker. The sinker 7 also forms a core upon which the body of the bait is secured, this body being formed by a plurality of longitudinal fibers as indicated at 8. These fibers are preferably in the form of the body hair from the pelt of a deer and by means of front and rear wrappings 9 and 10, the fibers are secured around the hook and the wire 3, the rear ends of the fibers simulating the tail of a living creature, while the front ends thereof are trimmed to simulate a head 11, the body, head and tail being painted to give them a realistic appearance.

The wrappings 9 and 10 are preferably of fine wire and this wire extends forwardly from the wrapping 9 through the head 11 as indicated at 12, being then wrapped several times around the wire 3 to form a collar 13 against which a bead 14 rests. This bead is mounted on the wire 3 and serves as a non-frictional bearing for a spinner on said wire. Another bead 16 is preferably located between the front end of the spinner 15 and the loop 5.

From the foregoing, it will be seen that I have provided certain distinct improvements over the patent previously granted to me, particular emphasis being laid upon the fact that the sinker 7 forms a core upon which to build the body 8 of the bait, as well as serving as a sinker and as means for rigidly connecting the hook 1 with the wire 3. By positioning this sinker approximately at the location shown, it enables the bait to be cast an unusually great distance.

Extension of the wire wrapping 9 to form the collar 13 is highly advantageous in the easy manufacture of the device but if desired other adequate provision could be made to prevent the spinner 15 from coming into contact with the head of the bait.

Since excellent results have been obtained from the details disclosed, they are preferably followed, but within the scope of the invention as claimed, numerous minor changes may be made.

I claim:

1. The combination with a fish hook and a carrying wire therefor, of a body of metal surrounding the adjacent portions of said hook and wire and rigidly securing them together, and a bait body secured around said hook and wire and simulating a living creature, said body of metal constituting a core around which said bait body is formed.

2. The combination with a fish hook having a laterally turned eye, a carrying wire for said hook passing through said eye and bent around the hook shank, a metal sinker surrounding the adjacent portions of said hook and wire and rigidly securing them together, and a bait body surrounding said sinker and secured upon said hook and wire, said sinker forming a core to impart the proper shape to said body.

3. The combination with a length of wire having a fish hook at one end, of a metal body surrounding said wire and constituting a sinker, and a bait body around said sinker and secured upon said wire, said sinker constituting a core imparting the proper shape to said body.

4. The combination with a length of wire having a fish hook at one end, of an elongated body of metal surrounding said wire and forming a sinker, a multiplicity of fibers surrounding said sinker and extending longitudinally thereof, and front and rear wrappings surrounding said fibers and securing them against said wire, the rear end of said fibers forming the tail of an artificial creature, the front ends of said fibers being trimmed to constitute the head, and the intermediate portions of said fibers forming the body.

5. The combination with a length of wire having a fish hook at one end, of an elongated body of metal surrounding said wire and forming a sinker, a multiplicity of fibers surrounding said sinker and extending longitudinally thereof, front and rear wrappings surrounding said fibers and securing them in place, the front wrapping being formed of wire and extending forwardly to the front ends of the fibers, at which point it is wound around the first named wire to form a fixed collar against which a spinner is adapted to contact; the front ends of the aforesaid fibers representing the head of a living creature, the intermediate portions of said fibers simulating the body of the creature, and the rear ends of the fibers representing a tail.

In testimony whereof I have hereunto set my hand.

ORLEY C. TUTTLE.